A. ROSENTHAL.
FILTER.
APPLICATION FILED JULY 17, 1915.
1,204,071.  Patented Nov. 7, 1916.
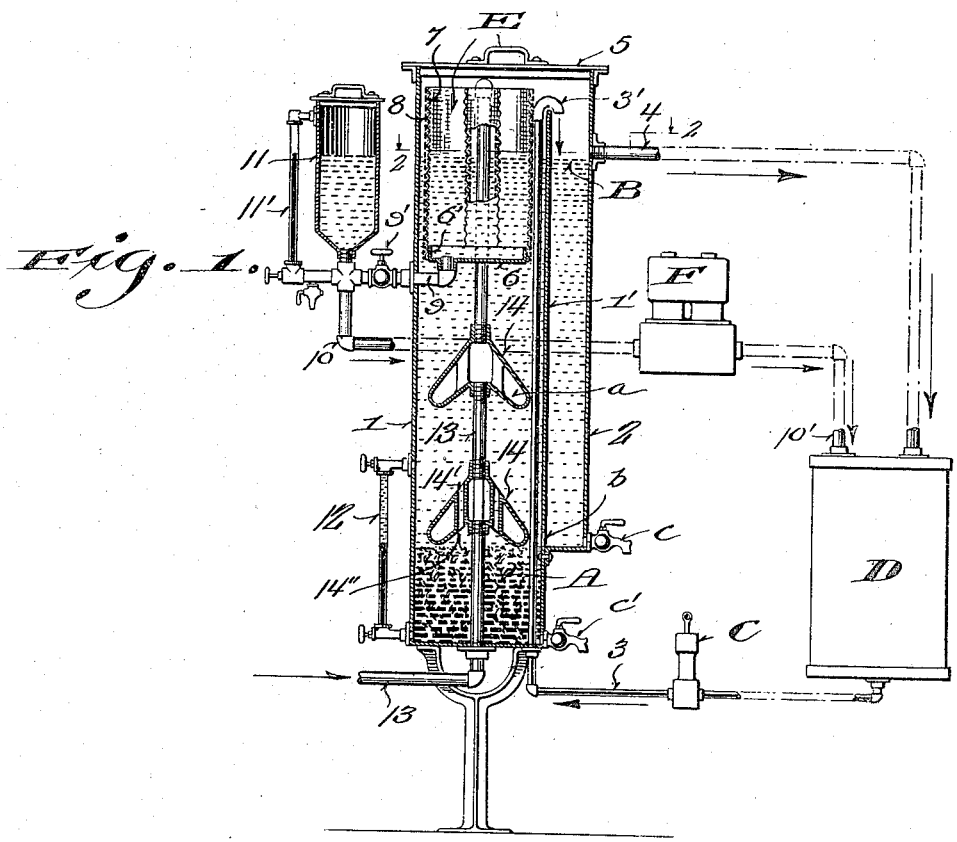
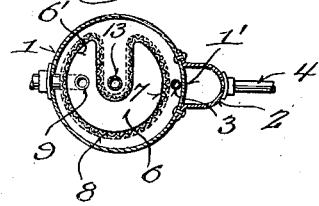
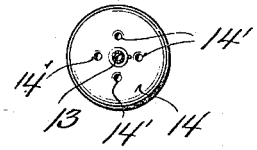
Witnesses:
Inventor:
August Rosenthal

UNITED STATES PATENT OFFICE.

AUGUST ROSENTHAL, OF WEST ALLIS, WISCONSIN.

FILTER.

1,204,071.  Specification of Letters Patent.  Patented Nov. 7, 1916.

Application filed July 17, 1915. Serial No. 40,482.

*To all whom it may concern:*

Be it known that I, AUGUST ROSENTHAL, a citizen of the United States, and resident of West Allis, in the county of Milwaukee and State of Wisconsin, have invented certain new and useful Improvements in Filters; and I do hereby declare that the following is a full, clear, and exact description thereof.

My invention has for its primary object to provide a simple, economical and effective fluid filter, the same being especially designed for use in connection with filtering either fuel or lubricating oils, but it is of course to be understood that the filter may be used in connection with other fluids. The arrangement and construction of the filtering apparatus is such that the unfiltered oil is discharged into the upper portion of a filling compartment, which compartment communicates with the lower portion or what might be termed the "settling chamber" of the main tank. Thus the coarser foreign matter contained in the oil is initially separated by precipitation and said coarser material will be massed in the bottom of the tank body. The lighter oil will rise in the tank and its flow upward is accelerated by contact with a heating medium, whereby the oil is thinned as it ascends. Hence in its rise a second filtration is effected due to the fact that the finer particles of foreign matter are released from the thin oil, which particles gradually drop to the settling chamber. The partially filtered oil is then mechanically purified by passing through the perforated walls of a filter at or near the surface of the oil. The purified oil is then caused to travel through a suitable pipe connection to the source of consumption, the same being drawn off from the filter as required. Thus the porous walls of the filter, are not subjected to the heavy duty of complete filtration and said filter walls will therefore not readily clog, it being understood that the last filtration is effected at a point near the surface of the body of the oil, which is comparatively at rest.

Another important feature of my construction and arrangement is that the filling or feed compartment receives the unfiltered oil from the bottom of a suitable reservoir under pump control, the said filling compartment being provided with an overflow whereby the surplusage of oil is returned to the reservoir by gravity. The mouth of the overflow pipe is positioned a predetermined distance from the top of the filling compartment whereby a constant level of oil is maintained within the body of the tank. Hence the duty of the filter is regulated only by the amount of oil consumed.

My invention also contemplates a pipe connection with the machine element using the oil, whereby the surplusage is returned to the top of the reservoir. Thus a complete cycle is had and the used oil which flows back into the reservoir is again filtered.

With the above and other minor objects in view the invention consists in certain peculiarities of construction and combination of parts as hereinafter set forth with reference to the accompanying illustrations and subsequently claimed.

In the drawings Figure 1 represents a sectional elevation of a filter tank embodying the features of my invention; Fig. 2, a cross-section of the same, the section being indicated by line 2—2 of Fig. 1, and Fig. 3, a detailed plan view of a hollow baffle-plate embodying one of the features of my invention.

Referring by characters to the drawings, 1 represents a vertical tank, the bottom portion A of which constitutes a settling chamber. The tank body is provided with a filling compartment 2, which compartment, in the exemplification of my invention, is shown in the form of a metallic shell that may be riveted or otherwise connected to or associated with the walls of the tank. The juxtaposed portion 1' of said wall forms a partition between the filling compartment and the main body of the tank, which wall portion terminates at a predetermined distance from the upper end of said tank, as shown. The wall portion 1', which comprises the partition between the filling compartment and main tank body, is formed with a flow aperture *b* near the bottom of the filling compartment, which flow aperture constitutes a passage between said filling compartment and the tank body, at a point above the settling chamber A. A feed-pipe 3 is extended upwardly through the bottom of the tank body and terminates with a discharge mouth 3', which projects over the wall 1' and is adapted to discharge downwardly and above the level of the oil B or other fluid which is to be filtered. The feed-pipe 3 is interrupted by a pump C and said feed-pipe is connected to the bottom of a reservoir D, which reservoir is preferably positioned upon a level whereby the oil from its bottom is pumped upwardly and discharged into the upper end of the filling compartment. An overflow pipe 4 communicates with the upper portion of the filling compartment and also with the top portion of the reservoir D, whereby a constant level of oil is maintained both in the filling compartment and the main body 1 of the tank, the surplusage being adapted to flow by gravity back into the reservoir should the supply or feed be greater than the consumption of filtered oil. The top of the tank and filling compartment is closed by a lid 5 which may be readily removed.

Mounted in any suitable manner within the top portion of the tank body is a filter box E, which may be in the form of a hollow horseshoe in cross-section, as best shown in Fig. 2, whereby a large filter surface area is presented in proportion to the diameter of said filter box. The filter box is provided with a solid bottom 6 having upturned flanges 6', to which are suitably secured perforated drum-like walls 7, the same being preferably formed from screen-cloth and open at its upper end, which end is extended above the level of the oil, as shown. The perforated walls are fitted with a filter jacket 8, which jacket may be composed of burlap or other suitable material and there may be one or a series of layers. This jacket forms no part of my invention and may be affixed to the porous walls of the filter-box in any suitable manner. The bottom 6 of the filter box is provided with a discharge opening to which is attached a delivery pipe section 9, the said section being extended through the wall of the tank and provided with a suitable controlling valve 9'.

The main section 10 of the delivery pipe is connected to the section 9 by a cross coupling, as shown, and said main section leads to the machine element F to which the oil is supplied. In this instance the said machine element is diagrammatically shown in the form of an engine. If the supply of oil to the machine element is for lubricating purposes, the waste or surplusage is returned to the top of the reservoir D by a pipe connection 10', as shown. The cross coupling connection between the delivery pipe section 9 and 9' is also provided with a nipple for the reception of a priming cup 11 and the upper portion of the priming-cup is connected to the delivery pipe cross T by a gage 11', whereby the oil level is visibly displayed. The lower portion of the body of the tank may also be equipped with a gage 12, which extends from the tank bottom to a predetermined distance above the settling chamber A, whereby the line of demarcation between the refuse and clear oil level is disclosed to the operator.

In order to heat the oil body which is maintained in the tank 1, I provide a steam or hot water pipe 13, which pipe preferably enters the bottom of the tank and centrally thereof. The said pipe extends from the bottom to the top portion of the tank body and is led therefrom by a suitable branch connection to a source of exhaust. Attention is also directed to the fact that this heating pipe extends through the hollow neck of the filter box, whereby the full effects of the heat therefrom will result throughout the entire body of oil.

The pipe 13, which constitutes a heating medium for the oil, is interrupted by baffle-plates 14, the same being preferably hollow and circular in form and of less diameter than the diameter of the tank body. Hollow baffle-plates in some instances are preferred as such form heat chambers $a$, which communicate with the different portions of the pipe 13 and these heat chambers are interrupted at intervals by cored webs 14' which form oil passages through the baffle-plates in juxtaposition to the center of the same. The hollow baffle-plates are preferably conical in form and their under surfaces 14'' are tapered upwardly. Thus a maximum amount of heating surface is presented to the oil and as said oil rises, the major portion of the oil will be collected or delayed, by coming in contact with the lower inclined surfaces of the plate, whereby the full influence of the heat from the steam or hot water will result. A certain percentage of the oil which is delayed and heated is caused to travel up through the oil passages 14' and the greater portion of the oil is deflected by the baffle-plates, toward the juxtaposed surfaces of the tank body between which and the outer edges of the baffle-plates it will travel upwardly. This retardation of the thin oil will cause foreign matter therein to collect upon the inclined under surface of the baffle-plate whereby said particles are trapped and this separation of the finer particles of foreign matter from the oil will result, as the oil travels from the bottom of the tank to the top thereof. The contact of the oil with the collecting surfaces of the baffle-plates will also tend to cause the foreign particles to become loosened from the baffle-plate surfaces, which loosened particles will then gradually sink to the settling tank A. It will also be observed that the walls of the filter box are spaced from the walls of the tank body, whereby the surface oil for a predetermined depth, will surround the porous filter walls and thus be caused to percolate through the said filter walls to the interior of the box. The purified oil within the filter box will, as previously described, be drawn off through the pipe connections 9 and 10. As shown in Fig. 1 of the drawings, the feed-pipe 3 is extended upwardly through the main body of the tank, whereby it is subjected to the heating influence of the surrounding oil and heating element 13. Hence the unfiltered oil is to a certain extent thinned as it travels upwardly preparatory to being discharged into the filling compartment.

The priming cup 11 is provided for the purpose of supplying an initial quantity of pure oil for lubricating purposes, before the filtration operation takes place and also this cup is designed to receive a small quantity of priming oil for starting an engine, when the filtering apparatus is used in connection with a volatile fluid which constitutes the fuel supply for an engine of the internal combustion type.

It will be observed also that quantities of unfiltered oil may be poured into the filling compartment from above at any time by the operator without disarranging the filtering process as the surplusage of such unfiltered oil will simply flow back into the main reservoir D. It is therefore manifest that owing to the peculiar construction and arrangement of the filter as a whole, the laws of gravitation are taken advantage of and that the oil after being cleared of the coarser foreign matter, will rise to the top of the tank, at which point the final filtration takes place by causing the now thinned top oil to enter through the walls of a filter box and from the interior of said filter box it is drawn off as the demands may require. Hence the pumping apparatus for supplying the crude unfiltered oil may continue its operation without affecting the filtration method in any way as the surplusage which may be pumped to the filter will be caused to flow back into the main reservoir.

The bottom of the filling compartment is equipped with a draw off cock $c$ and a similar draw off cock $c'$ is fitted to the bottom of the body of the tank, which comprises the settling chamber A, whereby after the sediment has risen to a predetermined height, which will be displayed in the glass 12, the operator can manipulate this cock to clear the settling tank as the case may require.

It will also be observed, owing to the fact that the upper end of the tank is closed by a slip cover 5, access can be conveniently had to all of the mechanism, whereby the several elements can be removed for cleaning if desired, or the body of the tank as well as the filling compartment can be emptied of oil and thoroughly cleansed.

The portion of the heating pipe 13 that extends through the tank and filter may be sectional, and in such instance a convenient way of connecting said sections is by forming the baffle plates 14 with threaded sleeves that engage the ends of the sections to rigidly but separably couple the same.

I claim:

1. A liquid filter of the character described comprising a tank having a filling compartment in communication with the lower portion of said tank, the filling compartment being provided with an overflow to maintain a predetermined level of liquid within the tank, a feed pipe in communication with the upper portion of said filling compartment, filter means mounted within the upper portion of the tank, a delivery pipe in communication with the filter means, and a heating element extending into the tank comprising a radiator pipe having a series of hollow baffle plates connected therewith.

2. A liquid filter of the character described comprising a tank having a filling compartment in communication with the lower portion of said tank, the filling compartment being provided with an overflow to maintain a predetermined level of liquid within the tank, a feed pipe in communication with the upper portion of said filling compartment, filter means mounted within the upper portion of the tank, a delivery pipe in communication with the filter means, and a heating element for the tank comprising a pipe and one or more baffle-plates mounted in the tank between the lower portion thereof and the filter means.

3. A liquid filter of the character described comprising a tank having a filling compartment in communication with the lower portion of said tank, the filling compartment being provided with an overflow to maintain a predetermined level of liquid within the tank, a feed pipe in communication with the upper portion of said filling compartment, filter means mounted within the upper portion of the tank, a delivery pipe in communication with the filter means, a heating element for the tank, and baffle plates mounted in the tank between the filter means and lower portion thereof.

4. A liquid filter comprising a tank, a filling compartment in communication with the lower portion of the tank, the filling compartment being provided with an overflow to maintain a predetermined level of liquid within the tank, a feed pipe extending through the body of the tank and in communication with the upper portion of the filling compartment, a heating element mounted within the tank, a hollow filter positioned in the upper portion of the tank, and means for drawing liquid from the interior of said filter.

5. A liquid filter comprising a tank, a filling compartment in communication with the lower portion of the tank, a filter chamber in the upper portion of the tank, a priming cup disposed in horizontal alinement with the filter chamber, a pipe connecting the priming cup and the filter chamber and a delivery pipe extending from the cup.

6. A liquid filter comprising a tank provided with a filling compartment, a filter in the upper portion of the tank, a feed supply pipe extending through the bottom of the tank and discharging into the upper portion of the feed compartment, and a heater extending through the tank to the filter.

7. A liquid filter comprising a tank having a settling chamber in its base, a filling compartment in communication with the tank above the settling chamber, a filter in the upper portion of the tank, heating means extending through the tank and the filter, and feeding means discharging into the upper portion of the filling compartment.

8. In a liquid filter; the combination with a tank having a filter therein, and means for heating the tank and filter, an oil reservoir, a filling compartment in communication with the lower portion of the tank, overflow connections between the upper portion of the feed compartment and the upper portion of the reservoir, a feeding connection between the lower portion of the reservoir and the upper portion of the filling compartment.

9. In a liquid filter of the character described, the combination with a tank of a heating pipe extending therethrough, hollow baffle plates disposed about the pipe with their interiors in communication therewith, the walls of said baffle plates being inclined downwardly and fluid passages extending through the baffle plates.

In testimony that I claim the foregoing I have hereunto set my hand at Milwaukee, in the county of Milwaukee and State of Wisconsin, in the presence of a witness.

AUGUST ROSENTHAL.

Witness:
M. E. DOWNEY.

Copies of this patent may be obtained for five cents each, by addressing the "Commissioner of Patents, Washington, D. C."